1

United States Patent
Lendl (10) Patent No.: US 8,457,374 B2
(45) Date of Patent: Jun. 4, 2013

(54) SYSTEM FOR DETECTING CATHETERIZATION DEVICES

(75) Inventor: Markus Lendl, Ottensoos (DE)

(73) Assignee: Siemens Medical Solutions USA, Inc., Malvern, PA (US)

(*) Notice: Subject to any disclaimer, the term of this patent is extended or adjusted under 35 U.S.C. 154(b) by 662 days.

(21) Appl. No.: 12/777,563

(22) Filed: May 11, 2010

(65) Prior Publication Data

US 2010/0322499 A1   Dec. 23, 2010

Related U.S. Application Data (60) Provisional application No. 61/219,034, filed on Jun. 22, 2009.

(51) Int. Cl.
*G06K 9/00* (2006.01)
(52) U.S. Cl.
USPC .......................................................... 382/128
(58) Field of Classification Search
USPC .................. 382/128, 131; 600/7, 11, 411–435
See application file for complete search history.

(56) References Cited

U.S. PATENT DOCUMENTS

| 7,025,716 B1* | 4/2006 | Meloul et al. ..................... 600/7 |
| 2006/0041181 A1* | 2/2006 | Viswanathan et al. ............ 600/11 |
| 2008/0306376 A1* | 12/2008 | Hyde et al. ...................... 600/421 |
| 2010/0036241 A1* | 2/2010 | Mayse et al. ..................... 600/435 |
| 2010/0168553 A1* | 7/2010 | Martel et al. ................... 600/411 |

FOREIGN PATENT DOCUMENTS

| WO | 03043516 A2 | 5/2003 |
| WO | 2004051572 A2 | 6/2004 |
| WO | 2005104951 A1 | 11/2005 |

OTHER PUBLICATIONS

Meijering et al. "Retrospective Motion Correction in Digital Subtraction Angiography: A Review", IEEE Transactions on Medical Imaging, vol. 18, No. 1, Jan. 1999, pp. 2-21.

* cited by examiner

*Primary Examiner* — Gerald J. O'Connor
*Assistant Examiner* — Edward Winston, III
(74) *Attorney, Agent, or Firm* — Alexander J Burke (57) ABSTRACT

A medical image data processing system automatically identifies a catheterization device including marker objects for use in identifying the catheterization device in a medical image for Angiography or another medical procedure. The system includes an image data processor that automatically identifies non-marker objects in a medical image by comparing image data representing individual non-marker objects with image data representing a template non-marker object. The processor automatically identifies catheterization device marker objects by comparing image data representing individual candidate marker objects with image data representing a template marker object and by processing image representative data to provide processed image data excluding image data representing non-marker objects. A user interface generates data representing a display image indicating identified marker objects and an associated catheterization device using the processed image data for presentation to a user.

18 Claims, 10 Drawing Sheets

FIGURE 1

Prior Art

SYSTEM FOR DETECTING CATHETERIZATION DEVICES

This is a non-provisional application of provisional application Ser. No. 61/219,034 filed 22 Jun. 2009, by Markus Lendl.

FIELD OF THE INVENTION

This invention concerns a medical image data processing system for automatically identifying a catheterization device including marker objects for use in identifying the catheterization device in a medical image for Angiography or another medical procedure.

BACKGROUND OF THE INVENTION

Figure 1:
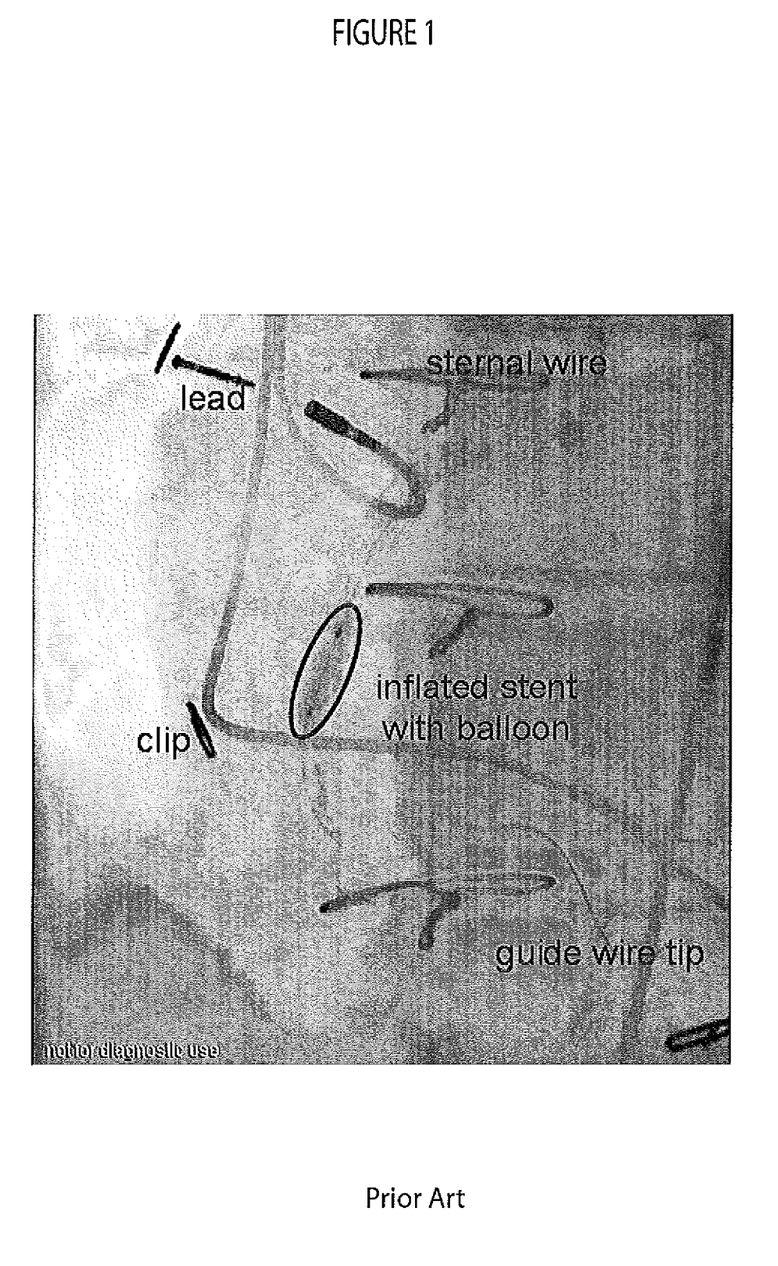
FIG. 1 shows a medical image including clips, guide wire tips, leads and sternal wires as high contrast objects that may potentially be confused with stent markers, for example.

It is desirable to provide an angiographic image showing a stent or other interventional instrument with precision and good visibility to enable evaluation of stent placement. The location and inflation status of a stent are of particular interest. A stent consists of a mesh of fine wires. Further, for the visualisation of stents during placement usually an X-ray based angiographic system is used. Displaying stent struts is a challenge when a patient is large and/or steep imaging angles are involved. Quality of images identifying stent location provided by known systems is typically limited because of reduced CNR (Contrast to Noise Ratio), for example. Known systems also lack reliability in detection of balloon marker spheres which are X-ray radio-opaque spheres located at a distal and proximal end of a stent deployment balloon, for example. Further, high contrast objects (like clips, guide wire tips, leads, sternal wires, as illustrated in FIG. 1) may lead to false detection of marker spheres. A system according to invention principles addresses these deficiencies and related problems.

SUMMARY OF THE INVENTION

A system automatically detects stents balloon markers in an angiogram that also contains other high contrast objects by detecting and labelling unwanted high contrast objects and by performing a marker search. A medical image data processing system automatically identifies a catheterization device including marker objects for use in identifying the catheterization device in a medical image for Angiography or another medical procedure. The system includes an image data processor that automatically identifies non-marker objects in a medical image by comparing image data representing individual non-marker objects with image data representing a template non-marker object. The processor automatically identifies catheterization device marker objects by comparing image data representing individual candidate marker objects with image data representing a template marker object and by processing image representative data to provide processed image data excluding image data representing non-marker objects. A user interface generates data representing a display image indicating identified marker objects and an associated catheterization device using the processed image data for presentation to a user.

DETAILED DESCRIPTION OF THE INVENTION

A system automatically detects balloon markers in an angiogram image that also contains other high contrast objects by detecting and labelling unwanted high contrast objects and by employing a marker object search. The system improves image quality using multiple images that are registered (aligned) based on the location of balloon marker spheres and averaged, for example. The system advantageously substantially increases CNR (Contrast to Noise Ratio) and enhances visibility of stent struts and the boundaries of a stent. A stent as used herein comprises an object such as a medical instrument or device that is used invasively within patient anatomy such as for a PTCA (Percutaneous Transluminal Coronary Angioplasty) procedure, for example. A marker sphere as used herein comprises a sphere or another radio-opaque object used to mark position or boundaries of a stent or invasive instrument.

Figure 2:
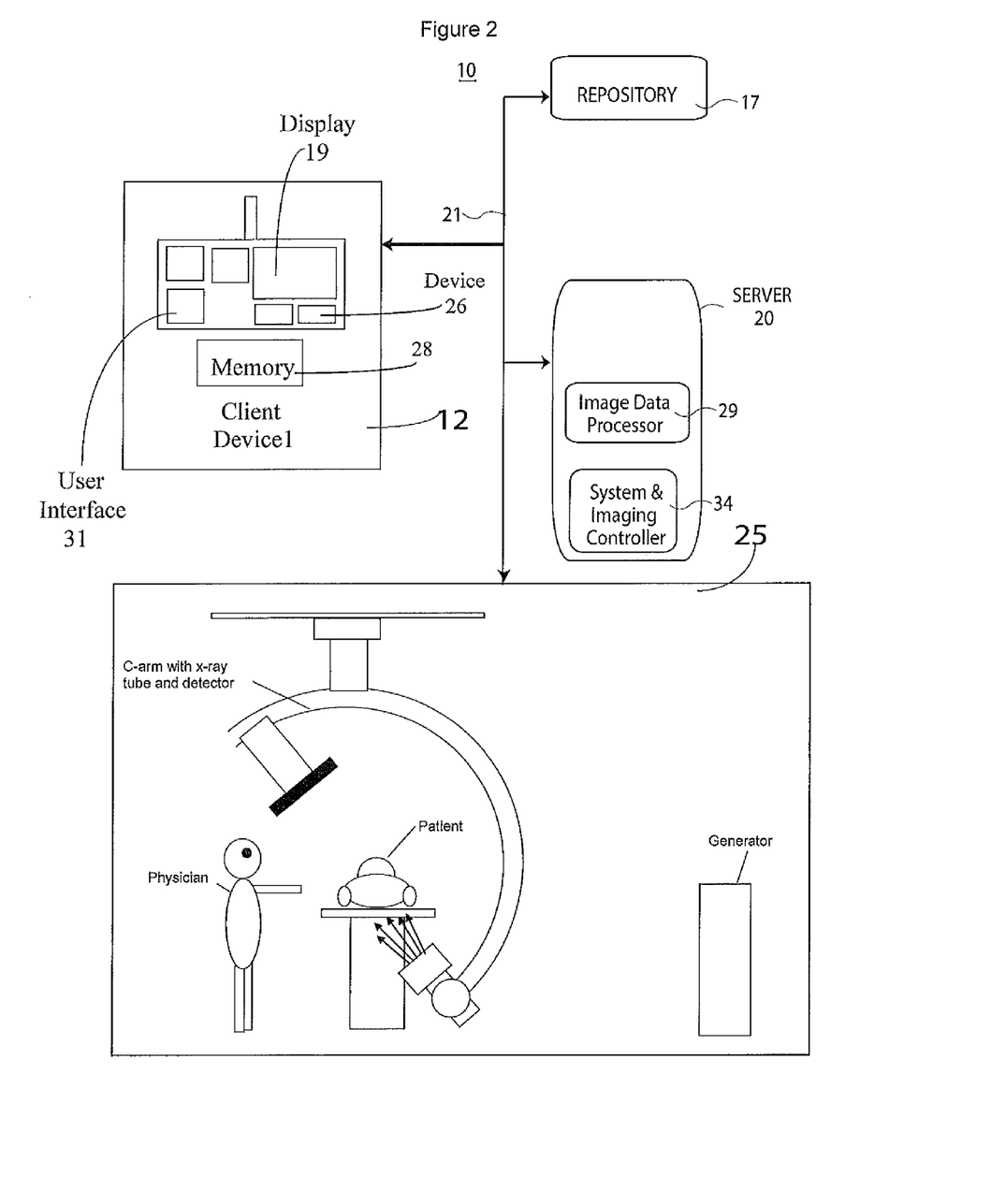
FIG. 2 shows a medical image data processing system for automatically identifying a catheterization device including marker objects for use in identifying the catheterization device in a medical image for Angiography or another medical procedure, according to invention principles.

FIG. 2 shows medical image data processing system 10 for automatically identifying a catheterization device including marker objects for use in identifying the catheterization device in a medical image for Angiography or another medical procedure. System 10 includes one or more processing devices (e.g., workstations or portable devices such as notebooks, Personal Digital Assistants, phones) 12 that individually include memory 28, user interface 31, display 19 and a data entry device 26 such as a keyboard, mouse, touchscreen, voice data entry and interpretation device. System 10 also includes at least one repository 17, X-ray imaging modality system 25 (which in an alternative embodiment may comprise an MR (magnetic resonance), CT scan, or Ultra-sound system, for example) and server 20 intercommunicating via network 21. X-ray modality system 25 comprises a C-arm X-ray radiation source and detector device rotating about a patient table and an associated electrical generator for providing electrical power for the X-ray radiation system. The display images are generated in response to predetermined user (e.g., physician) specific preferences. At least one repository 17 stores medical image studies for multiple patients in DICOM compatible (or other) data format. A medical image study individually includes multiple image series of a patient anatomical portion which in turn individually include multiple images. Server 20 includes image data processor 29 and system and imaging controller 34. User interface 31 generates data representing display images comprising a Graphical User Interface (GUI) for presentation on display 19 of processing device 12. Imaging controller 34 controls operation of imaging device 25 in response to user commands entered via data entry device 26. In alternative arrangements, one or more of the units in server 20 may be located in device 12 or in another device connected to network 21.

Image data processor 29 automatically identifies non-marker objects in a medical image by comparing image data representing individual non-marker objects with image data representing a template non-marker object. Processor 29 automatically identifies catheterization device marker objects by comparing image data representing individual candidate marker objects with image data representing a template marker object and processes image representative data to provide processed image data excluding image data representing non-marker objects. User interface 31 generates data representing a display image indicating identified marker objects and an associated catheterization device using the processed image data for presentation to a user.

Image data processor 29 employs a marker search to improve image quality and reliability and accuracy of detection of stent marker spheres (or other marker objects). Data representing individual images of a sequence of angiographic images (e.g. an image series) are processed to generate a stent image with improved quality. In one embodiment, in order to identify high contrast objects, image data processor 29 searches for relatively large (compared to a stent marker sphere) high contrast objects in an image. In response to identifying such objects, image data processor 29 identifies and marks the connected pixels comprising the objects with an indicator. The indicator identifies the connected pixels comprising an object as "invalid for stent marker sphere search", for example and processor 29 excludes them from being considered as stent marker spheres. Processor 29 further performs a marker sphere search by searching in the remaining image area for marker spheres by comparing image objects with predetermined template shapes. An image object is identified by identifying luminance transitions indicating an object boundary. The system selects correct marker sphere pairs from the objects found and registers (aligns) images based on the marker sphere pairs. The system further averages the data representing the registered images and displays a resulting averaged image with improved CNR.

Figure 3:
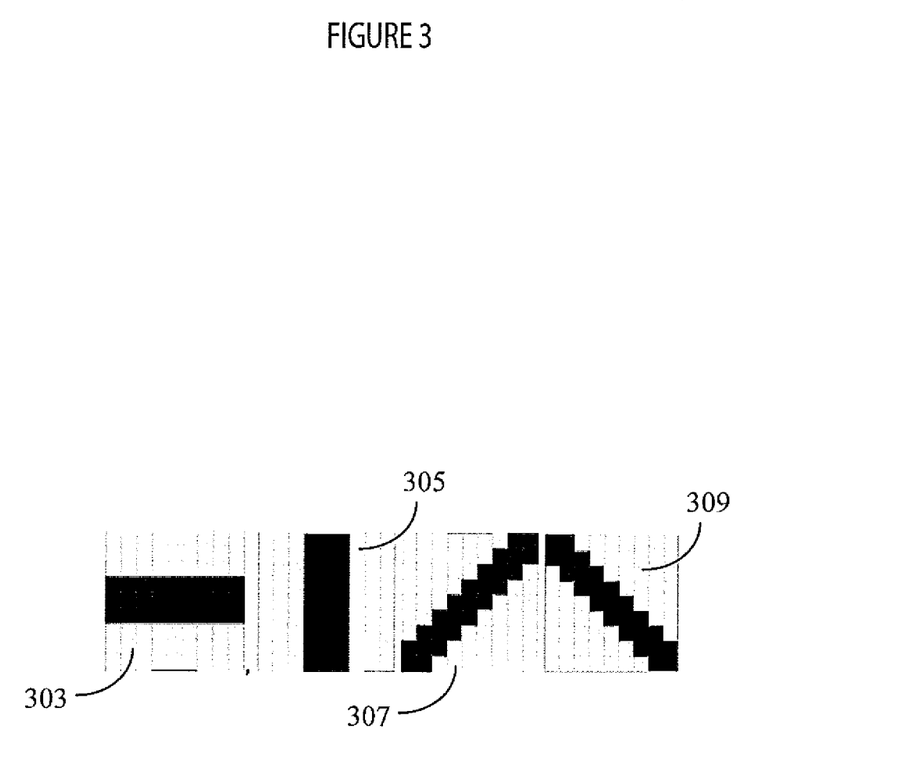
FIG. 3 shows image object templates that look similar to the shape of wires and other stretched objects, according to invention principles.

Image data processor 29 performs a search for high contrast objects in data representing an image by determining a normalized cross-correlation (NCC) measure indicating cross-correlation between a predetermined template and the image data of a region of interest (ROI). In one embodiment, the template is selected to match characteristics of (unwanted) high contrast objects but not the marker spheres. The normalized cross-correlation (NCC) measure between the luminance values of n individual pixels of current ROI (region of interest) of input image $I_{ROI(x,y)}$ and the luminance values of n individual pixels of a fixed template $I_0$ (of the same size) is, $$NCC(x, y) = \frac{\sum_{n \in ROI} I_{ROI(x,y)}(n) I_0(n)}{\sqrt{\sum_{n \in ROI} I^2_{ROI(x,y)} \sum_{n \in ROI} I^2_0(n)}} \quad \text{equation 1}$$

which generates numbers between 0 and 1, where "1" means "perfect fit". FIG. 3 shows image object templates $I_0$ (303, 305, 307 and 309) that look similar to the shape of wires and other stretched objects.

Image data processor 29 applies a summation or maximum value selection operation to resulting NCC values if different templates are applied concurrently in order to get a single NCC value for each individual ROI. The NCC values comprise data representing an image. Processor 29 identifies NCC values in the NCC image representative data that exceed a threshold and allocates a 0 or 1 value to the pixels. The resulting binary image representative data marks regions that are likely to be parts of (unwanted) high contrast objects. Image data processor 29 adaptively applies one of a variety of different data thresholding methods in deriving the binary image representative data. In one method processor 29 selects a predetermined fraction of image pixels with the largest NCC values. Alternatively, processor 29 selects pixels individually having a value exceeding a threshold of 105% of the mean NCC value of the ROI, for example. In another method processor 29 selects pixels having a value exceeding a threshold of 30% of the difference between a mean NCC and a maximum NCC value about the mean NCC value, for example. Processor 29 further morphologically "closes" the marked regions by retaining data representing relatively "large" (unwanted) high contrast objects, comprising groups of 8-connected regions smaller than 100 pixels, for example, and by indicating these objects as wanted high contrast object for use in marker sphere search.

Figure 4:
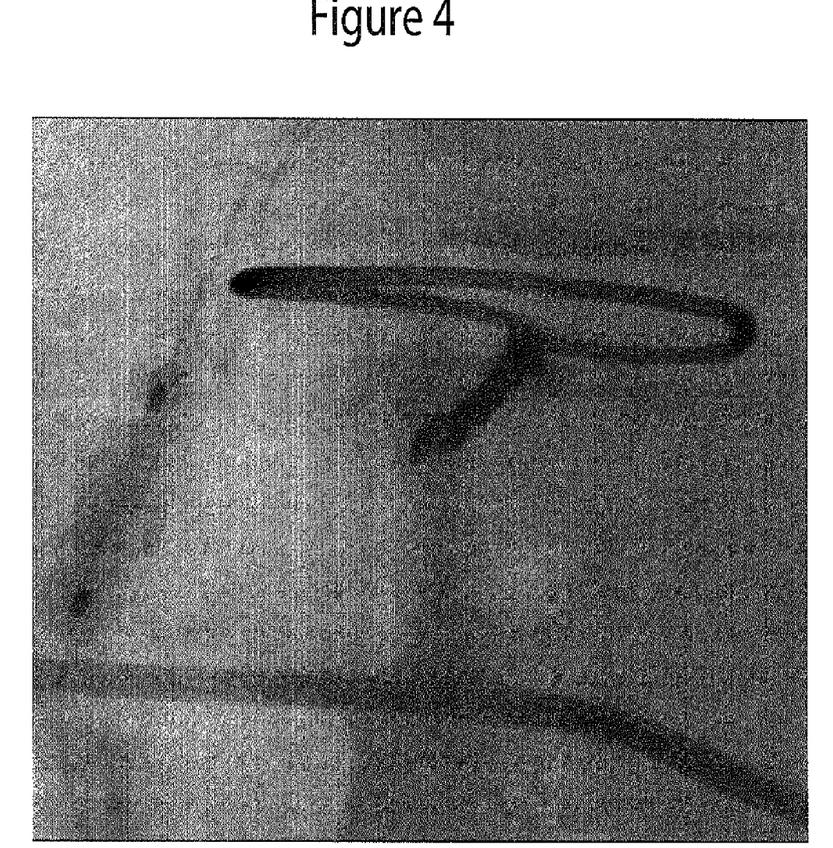
FIG. 4 shows an input image processed by the medical image data processing system, according to invention principles.
Figure 5:
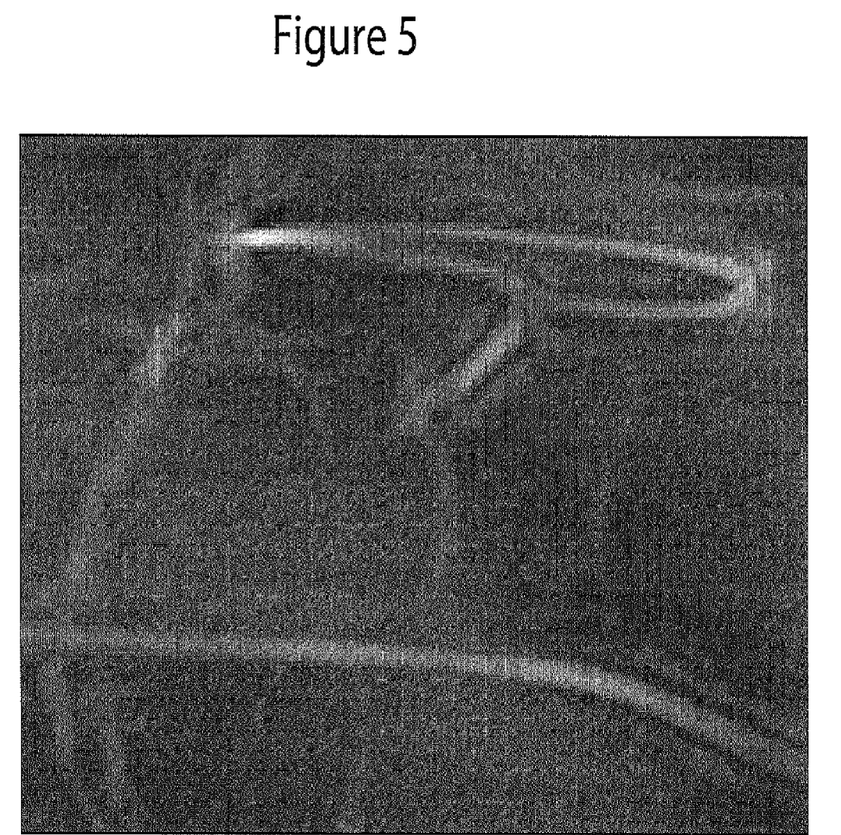
FIG. 5 shows an output image provided by the medical image data processing system by processing the input image of FIG. 4, according to invention principles.
Figure 6:
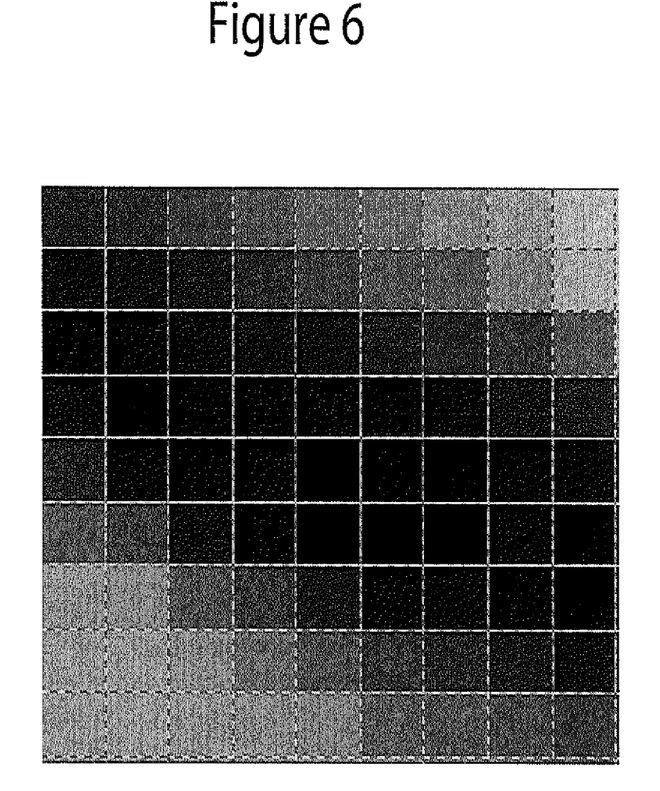
FIG. 6 shows a small Region of Interest of the input image of FIG. 4, that has the same size as the normalized cross-correlation (NCC) based templates in FIG. 3, according to invention principles.

FIG. 4 shows an input image processed by image data processor 29. Processor 29 in a ROI, matches the image data representing the image of FIG. 4 with image object templates 303, 305, 307 and 309 (FIG. 3) and determines NCC values. Specifically, processor 29 in a 9 by 9 pixel ROI shown in FIG. 6 (of the image of FIG. 4) calculates NCC values for image object templates 303, 305, 307 and 309 and corresponding matching portions of the ROI using equation 1, for example. The calculated NCC values for image portions for the individual four templates 303, 305, 307 and 309 are, 0.43, 0.32, 0.18, and 0.85, respectively. Also processor 29 calculates a maximum NCC value 0.85 for the centre pixel of the ROI. FIG. 5 shows a resulting output image provided by image data processor 29 comprising the 10% largest NCC values derived by processing the input image of FIG. 4. In FIG. 5, the bright grey elements indicate a good fit (relatively large NCC values) to any of the image object templates 303, 305, 307 and 309.

Figure 7:
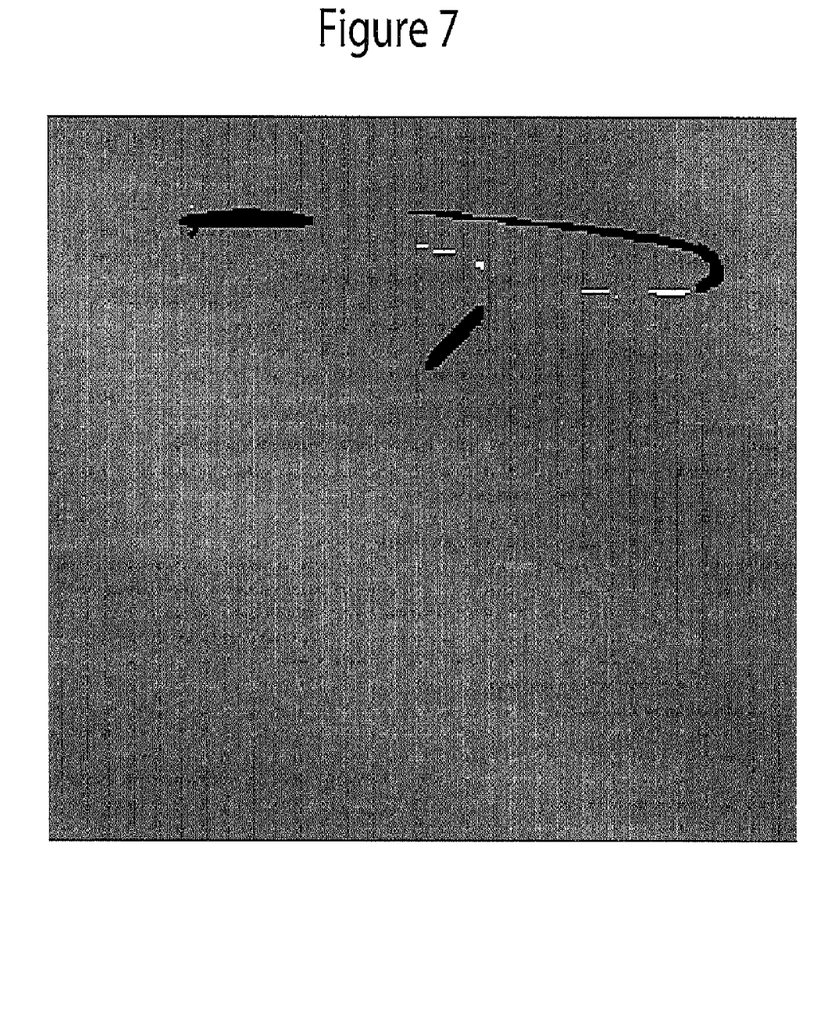
FIG. 7 shows an image identifying objects having normalized cross-correlation (NCC) luminance values exceeding a predetermined threshold and comprising black regions of more than 100 connected pixels in size and white regions of less than 100 connected pixels in size, according to invention principles.
Figure 8:
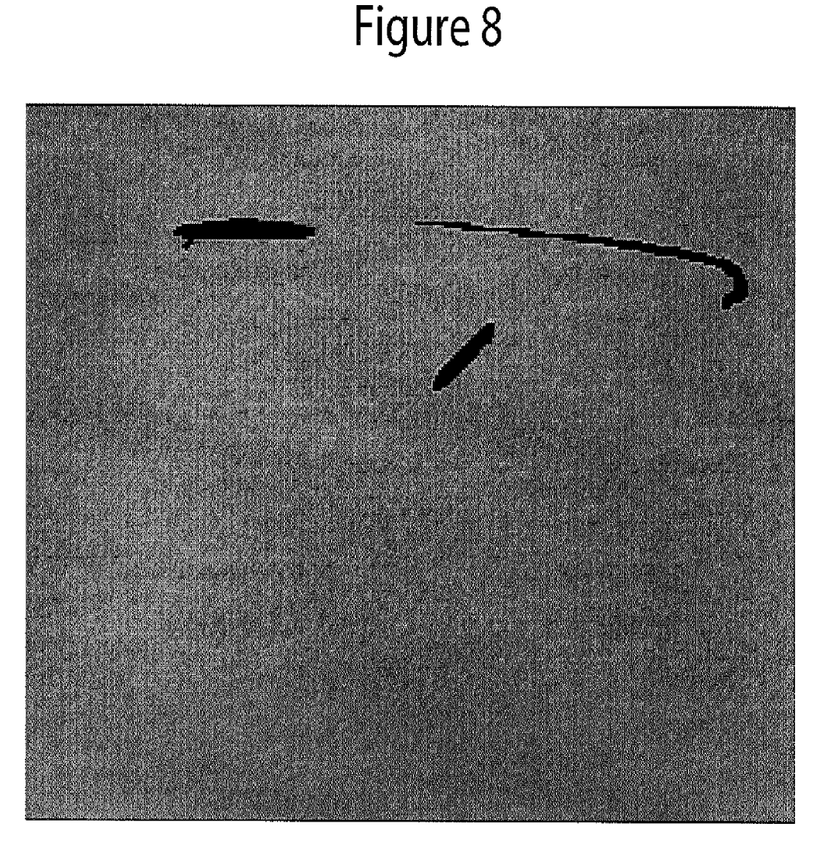
FIG. 8 shows the image data of FIG. 7 filtered to present black regions of more than 100 connected pixels in size, according to invention principles.

Processor 29 further applies a threshold to the calculated NCC pixel values and selects 10% of the largest NCC values indicated as marked regions. Processor 29 further morphologically closes the marked regions. FIG. 7 shows the resulting image identifying objects having normalized cross-correlation (NCC) luminance values exceeding the predetermined threshold and comprising black regions of more than 100 connected pixels in size and white regions of less than 100 connected pixels in size. FIG. 8 shows the image data of FIG. 7 filtered to present black regions of more than 100 connected pixels in size used as a mask for a search for marker sphere objects indicating a stent.

In one embodiment, image data processor 29 performs a search for marker sphere objects in a similar manner to a search for unwanted high contrast objects involving applying template matching using a template characteristic that matches a marker sphere. Regions marked as comprising an "unwanted object" are allocated an NCC value smaller or equal to the NCC mean value of a ROI. Processor 29 calculates NCC values for marker sphere templates and corresponding matching portions of the ROI using equation 1. In one embodiment, processor 29 employs a high pass filter instead of an NCC filter and the filter kernel is adaptively adjusted to expected size of the (unwanted or wanted) high contrast objects.

System 10 (FIG. 1) enables images including high contrast objects (like clips, guide wire tips, leads, sternal wires) to be contrast enhanced and is of particular use for angiographic imaging examinations and potentially PTCAs. In contrast, lower image quality of known systems used for an angiographic procedure may cause a false diagnosis and unnecessary X-ray exposure for acquisition of an angiographic image series used for further image processing and enhancement.

Figure 9:
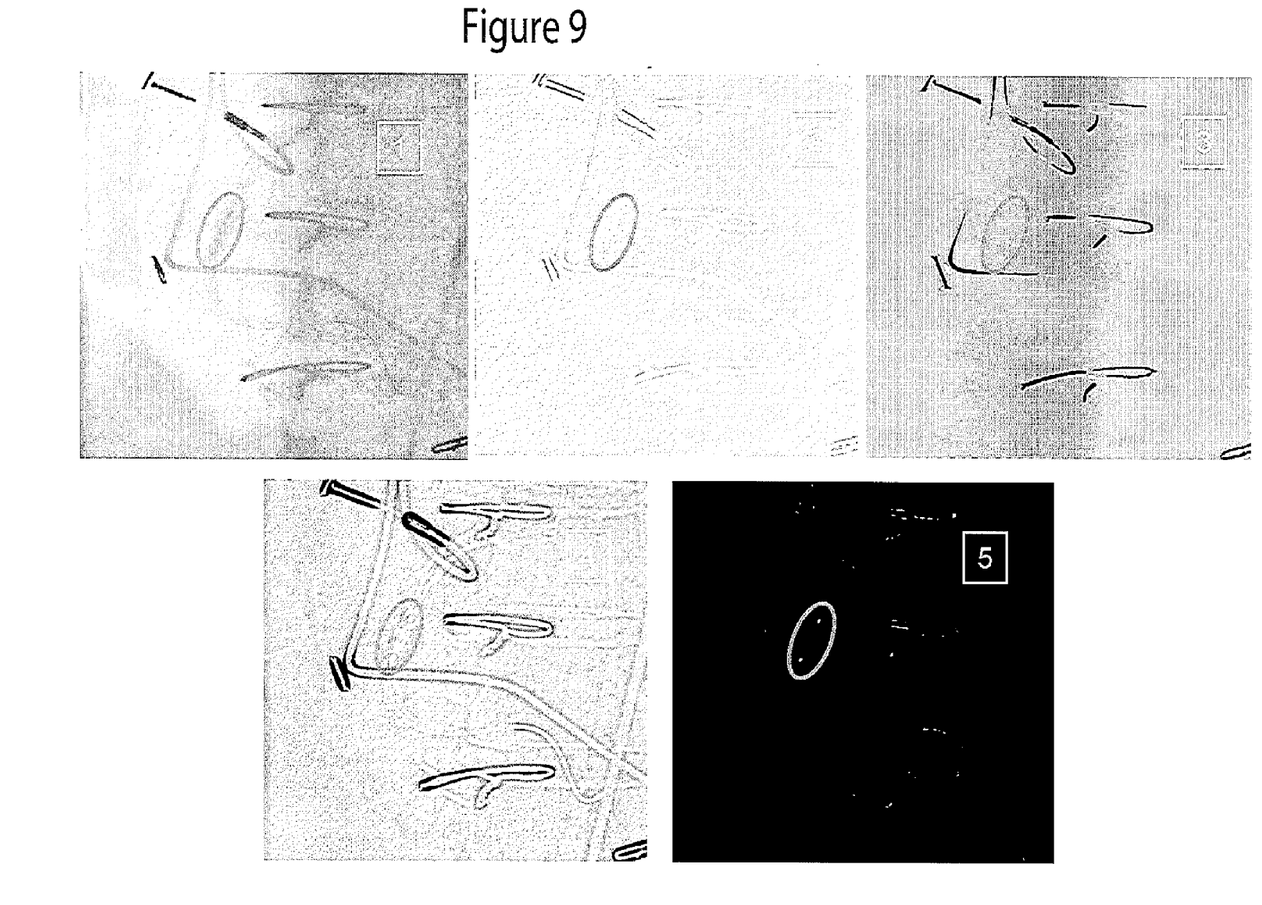
FIG. 9 shows images at different stages of processing by a system for automatically identifying a catheterization device, according to invention principles.

FIG. 9 shows images at different stages of processing provided by image data processor 29 in automatically identifying a catheterization device. A wanted stent and its marker spheres are indicated as encircled in images 1-5 of FIG. 9. Image 1 is an input image comprising a single image of an angiographic image series including the encircled wanted stent and its marker spheres and multiple unwanted non-marker objects including clips, guide wire tips, leads, sternal wires, for example. Processor 29 calculates NCC values for four directional non-marker templates and corresponding matching portions of a ROT using equation 1 and selects the maximum NCC values resulting from matching any of the non-marker templates (producing four sub-images) to produce a single bright image (image 2) with the highest NCC response indicating best match with a template. Processor 29 processes the data representing image 2 using a threshold method and morphologically closes the image as previously described to provide image 3. The dark areas of image 3 comprise unwanted "high contrast objects". Processor 29 identifies the white regions of image 3 as being too small to be classified as "high contrast objects". Note, the marker spheres are not detected in the image 3 data.

Processor 29 calculates NCC values using a marker sphere specific template and corresponding matching portions of a ROI using equation 1 and selects the maximum NCC values resulting from matching the marker template to produce a single bright image (image 4) with the highest NCC response indicating best match with the template and indicating the encircled marker spheres of the stent. Processor 29 processes the data representing image 4 using a threshold method and morphologically closes the image as previously described to provide image 5. The white areas of image 5 comprise potential stent "marker sphere" that are nicely detected.

Figure 10:
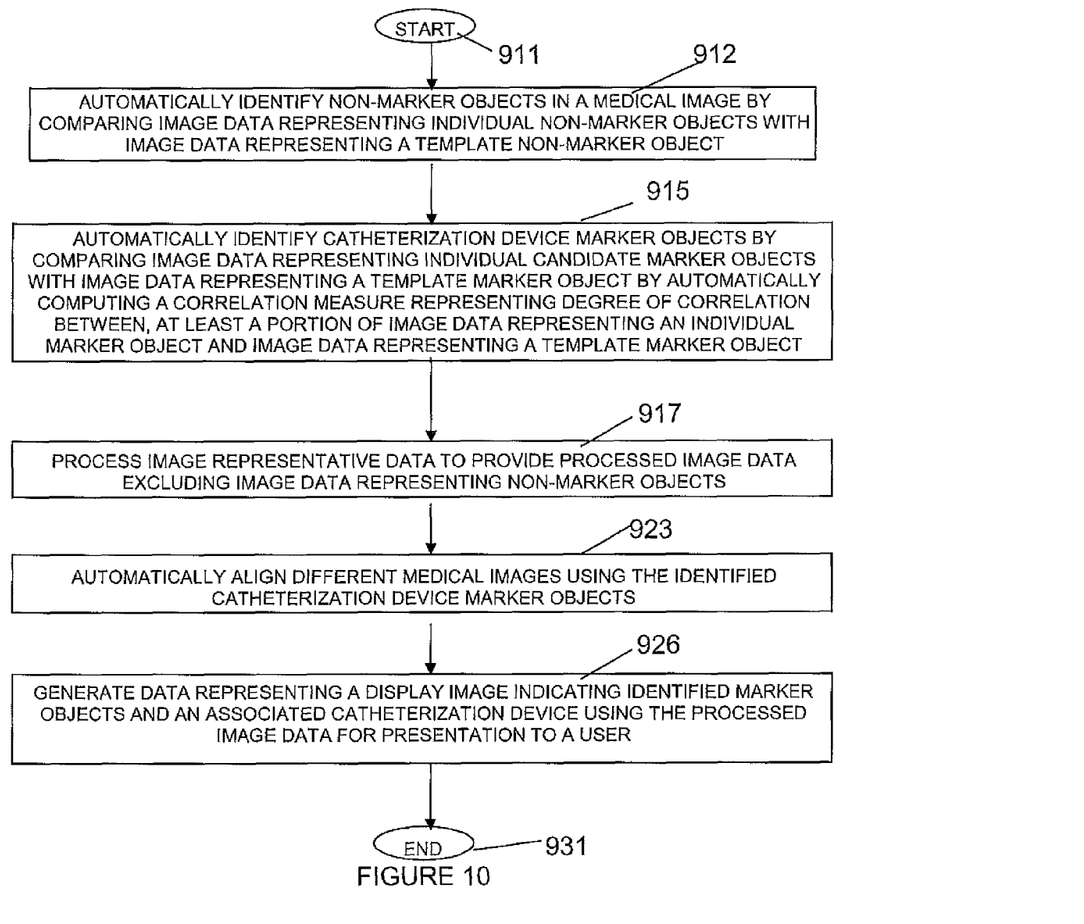
FIG. 10 shows a flowchart of a process used by a medical image data processing system for automatically identifying a catheterization device including marker objects, according to invention principles.

FIG. 10 shows a flowchart of a process used by medical image data processing system 10 for automatically identifying a catheterization device including marker objects. The catheterization device comprises a stent and the marker objects are a pair of balloon markers attached to the stent, for example. In step 912 following the start at step 911, image data processor 29 automatically identifies non-marker objects in a medical image by comparing image data representing individual non-marker objects with image data representing one or more different template non-marker objects. This is done by automatically computing a correlation measure representing degree of correlation between, at least a portion of image data representing an individual non-marker object and image data representing a template non-marker object. Image data processor 29 automatically identifies a non-marker object comprising at least a portion of image data representing an individual non-marker object in response to a computed correlation measure exceeding a predetermined threshold value indicating a predetermined minimum degree of correlation between, at least a portion of the image data representing an individual non-marker object and the image data representing a template non-marker object. The one or more different template non-marker objects comprise one or more linear catheter/wire/clips section representative objects at different relative angles.

Image data processor 29 in step 915 automatically identifies catheterization device marker objects by comparing image data representing individual candidate marker objects with image data representing a template marker object by automatically computing a correlation measure representing degree of correlation between, at least a portion of image data representing an individual marker object and image data representing a template marker object. Image data processor 29 automatically identifies a marker object comprising at least a portion of image data representing an individual marker object in response to a computed correlation measure exceeding a predetermined threshold value indicating a predetermined minimum degree of correlation between, at least a portion of the image data representing an individual marker object and the image data representing a template marker object. In step 917 processor 29 processes image representative data to provide processed image data excluding image data representing non-marker objects (e.g. sternal wires) by selectively excluding image data representing non-marker objects in response to identification of non-marker objects.

In step 923 image data processor 29 automatically aligns different medical images using the identified catheterization device marker objects and averages image data representing different medical images aligned using the identified catheterization device marker objects. User interface 31 in step 926 generates data representing a display image indicating identified marker objects and an associated catheterization device using the processed image data for presentation to a user. User interface 31 generates data representing the display image by selectively suppressing and excluding identified non-marker objects and excluding from suppression at least one non-marker object comprising sternal wires in response to excluding the identified non-marker objects and at least one non-marker object during object search. The averaged resulting image data is displayed. The marker objects are identified to be excluded (suppressed) from the marker search so when the (correct) markers are found, the registration ("alignment") and averaging process is performed on the original image data and the averaged resulting image is displayed. The system advantageously enhances display of the catheterization device. The process of FIG. 10 terminates at step 931.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A graphical user interface (GUI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 2-10 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system automatically detects balloon markers in an angiogram image containing other high contrast objects by detecting and labelling unwanted high contrast objects and by using a marker search to enhance visibility of stent struts and the boundaries of the stent. Further, the processes and applications may, in alternative embodiments, be located on one or more (e.g., distributed) processing devices on a network linking the units of FIG. 2. Any of the functions and steps provided in FIGS. 2-10 may be implemented in hardware, software or a combination of both.

What is claimed is:

1. A medical image data processing system for automatically identifying a catheterization device including marker objects for use in identifying the catheterization device in a medical image for Angiography or another medical procedure, comprising:
an image data processor configured to:
automatically identify non-marker objects in a medical image by comparing image data representing individual non-marker objects with image data representing a template non-marker object,
automatically identify catheterization device marker objects by comparing image data representing individual candidate marker objects with image data representing a template marker object and
process image representative data to provide processed image data excluding image data representing non-marker objects; and
a user interface for generating data representing a display image indicating identified marker objects and an associated catheterization device using said processed image data for presentation to a user.

2. A system according to claim 1, wherein said image data processor compares image data representing individual non-marker objects with image data representing a plurality of different template non-marker objects.

3. A system according to claim 2, wherein said plurality of different template non-marker objects comprises a plurality of linear catheter section representative objects at different relative angles.

4. A system according to claim 1, wherein said user interface generates data representing said display image excluding identified non-marker objects in response to excluding the identified non-marker objects and at least one non-marker object during object search.

5. A system according to claim 1, wherein said user interface generates data representing said display image suppressing identified non-marker objects in response to excluding the identified non-marker objects and at least one non-marker object during object search.

6. A system according to claim 5, wherein said user interface generates data representing said display image by selectively suppressing identified non-marker objects and excluding from suppression at least one non-marker object comprising sternal wires in response to excluding the identified non-marker objects and at least one non-marker object during object search.

7. A system according to claim 1, wherein said image data processor selectively excludes image data representing non-marker objects in response to identification of non-marker objects, said processed image data including particular non-marker objects.

8. A system according to claim 7, wherein the included particular non-marker objects comprise sternal wires.

9. A system according to claim 1, wherein said image data processor automatically identifies a non-marker object by computing a correlation measure representing degree of correlation between, at least a portion of image data representing an individual non-marker object and image data representing a template non-marker object.

10. A system according to claim 9, wherein said image data processor automatically identifies a non-marker object comprising at least a portion of image data representing an individual non-marker object in response to a computed correlation measure exceeding a predetermined threshold value indicating a predetermined minimum degree of correlation between, at least a portion of the image data representing an individual non-marker object and the image data representing a template non-marker object.

11. A system according to claim 1, wherein said image data processor automatically identifies a marker object by computing a correlation measure representing degree of correlation between, at least a portion of image data representing an individual marker object and image data representing a template marker object.

12. A system according to claim 11, wherein said image data processor automatically identifies a marker object comprising at least a portion of image data representing an individual marker object in response to a computed correlation measure exceeding a predetermined threshold value indicating a predetermined minimum degree of correlation between, at least a portion of the image data representing an individual marker object and the image data representing a template marker object.

13. A system according to claim 1, wherein said image data processor automatically aligns different medical images using the identified catheterization device marker objects.

14. A system according to claim 13, wherein said image data processor averages image data representing different medical images aligned using the identified catheterization device marker objects.

15. A system according to claim 1, wherein said catheterization device comprises a stent and said marker objects are a pair of balloon markers attached to the stent.

16. A medical image data processing system for automatically identifying a catheterization device including marker objects for use in identifying the catheterization device in a medical image for Angiography or another medical procedure, comprising:
   an image data processor configured to:
      automatically identify non-marker objects in a medical image by comparing image data representing individual non-marker objects with image data representing a template non-marker object,
      automatically identify catheterization device marker objects by comparing image data representing individual candidate marker objects with image data representing a template marker object by computing a correlation measure representing degree of correlation between, at least a portion of image data representing an individual marker object and image data representing a template marker object; and
   a user interface for generating data representing a display image indicating identified marker objects and an associated catheterization device for presentation to a user.

17. A system according to claim 16, wherein said image data processor automatically aligns different medical images using the identified catheterization device marker objects.

18. A method for automatically identifying a catheterization device including marker objects for use in identifying the catheterization device in a medical image for Angiography or another medical procedure, comprising the activities of:
   an image data processor automatically identifying non-marker objects in a medical image by comparing image data representing individual non-marker objects with image data representing a template non-marker object,
   an image data processor automatically identifying catheterization device marker objects by comparing image data representing individual candidate marker objects with image data representing a template marker object by automatically computing a correlation measure representing degree of correlation between, at least a portion of image data representing an individual marker object and image data representing a template marker object; and
   an image data processor generating data representing a display image indicating identified marker objects and an associated catheterization device for presentation to a user.

* * * * *